United States Patent
Lerios (10) Patent No.: US 10,269,087 B2
(45) Date of Patent: Apr. 23, 2019

(54) LANGUAGE TRANSLATION USING PREPROCESSOR MACROS

(71) Applicant: Facebook, Inc., Menlo Park, CA (US)

(72) Inventor: Apostolos Lerios, Austin, TX (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/720,928

(22) Filed: May 25, 2015

(65) Prior Publication Data

US 2015/0339797 A1 Nov. 26, 2015

Related U.S. Application Data

(63) Continuation of application No. 13/328,049, filed on Dec. 16, 2011, now Pat. No. 9,043,766.

(51) Int. Cl.
*G06F 1/20* (2006.01)
*G06T 1/20* (2006.01)
*G06F 8/30* (2018.01)
*G06F 8/41* (2018.01)

(52) U.S. Cl.
CPC ........... *G06T 1/20* (2013.01); *G06F 8/315* (2013.01); *G06F 8/423* (2013.01); *G06F 8/433* (2013.01)

(58) Field of Classification Search
None
See application file for complete search history.

(56) References Cited

U.S. PATENT DOCUMENTS

| | | | | |
|---|---|---|---|---|
| 5,784,610 A | * | 7/1998 | Copeland, III | G06F 17/30073 |
| 2002/0097247 A1 | * | 7/2002 | Ohba | G06F 3/011 |
| | | | | 345/501 |
| 2003/0055896 A1 | * | 3/2003 | Hu | G06F 3/1454 |
| | | | | 709/205 |
| 2004/0184643 A1 | * | 9/2004 | Stantchev | A61B 6/14 |
| | | | | 382/128 |
| 2004/0263314 A1 | * | 12/2004 | Dorai | G06F 21/32 |
| | | | | 340/5.2 |
| 2005/0275729 A1 | * | 12/2005 | Billerbeck | G06F 3/0481 |
| | | | | 348/222.1 |

(Continued)

OTHER PUBLICATIONS

NPL-Vernon-Chap004-2005, Title "Veronon's Machine Vision" chapter 4, located at : http://homepages.inf.ed.ac.uk/rbf/BOOKS/VERNON/Chap004.pdf 2005.*

(Continued)

*Primary Examiner* — Hossain M Morshed
(74) *Attorney, Agent, or Firm* — Fenwick & West LLP (57) ABSTRACT

A method is provided for providing consistent logical code across specific programming languages. The method incorporates preprocessor macros in a source computer program code to generate a program control flow. The preprocessor macros can be used to describe program control flow in the source programming language for execution in the source computer program code. The preprocessor macros can also be used to generate control flow objects representing the control flow, which converts the source computer program code into a general language representation. The general language representation when executed is used to output computer programming code in specific programming languages representing the same logical code as that of the source computer program code.

8 Claims, 4 Drawing Sheets

(56) References Cited

U.S. PATENT DOCUMENTS

| | | | | |
|---|---|---|---|---|
| 2005/0289519 A1* | 12/2005 | Sazegari | ................ | G06F 8/443 |
| | | | | 717/136 |
| 2007/0030357 A1* | 2/2007 | Levien | ................ | G06T 1/0007 |
| | | | | 348/211.14 |
| 2007/0172107 A1* | 7/2007 | Jones | ................ | G06K 9/033 |
| | | | | 382/137 |
| 2008/0021877 A1* | 1/2008 | Saito | ................ | G06F 19/321 |
| 2008/0088871 A1* | 4/2008 | Fukasawa | ................ | G06F 21/608 |
| | | | | 358/1.15 |
| 2008/0109795 A1* | 5/2008 | Buck | ................ | G06F 8/443 |
| | | | | 717/137 |
| 2009/0002744 A1* | 1/2009 | Shimada | ................ | G06F 17/30247 |
| | | | | 358/1.15 |
| 2009/0051962 A1* | 2/2009 | Asai | ................ | G06F 3/1205 |
| | | | | 358/1.15 |
| 2009/0210487 A1* | 8/2009 | Westerhoff | ................ | G06T 15/005 |
| | | | | 709/203 |
| 2009/0226062 A1* | 9/2009 | Nakamura | ................ | G06F 17/3028 |
| | | | | 382/128 |
| 2010/0002102 A1* | 1/2010 | Carpio | ................ | G06T 5/00 |
| | | | | 348/241 |
| 2010/0123928 A1* | 5/2010 | Morimoto | ................ | G06K 9/3208 |
| | | | | 358/1.15 |
| 2010/0253690 A1* | 10/2010 | Rose | ................ | G06F 1/3218 |
| | | | | 345/502 |
| 2011/0254859 A1* | 10/2011 | Matsuda | ................ | G06F 3/13 |
| | | | | 345/633 |
| 2011/0273470 A1* | 11/2011 | Ohba | ................ | G06F 3/0481 |
| | | | | 345/619 |
| 2011/0279837 A1* | 11/2011 | Muramatsu | ................ | G06F 3/122 |
| | | | | 358/1.9 |
| 2011/0320520 A1* | 12/2011 | Jain | ................ | G06F 9/5072 |
| | | | | 709/203 |
| 2012/0010995 A1* | 1/2012 | Skirpa | ................ | G06F 3/0481 |
| | | | | 705/14.49 |
| 2012/0075668 A1* | 3/2012 | Ikeda | ................ | H04N 1/00127 |
| | | | | 358/1.15 |
| 2012/0081743 A1* | 4/2012 | Watanabe | ................ | G06F 17/3089 |
| | | | | 358/1.15 |
| 2012/0110601 A1* | 5/2012 | Spencer | ................ | G06F 9/445 |
| | | | | 719/328 |
| 2013/0208966 A1* | 8/2013 | Zhao | ................ | G06F 9/5072 |
| | | | | 382/131 |
| 2015/0081215 A1* | 3/2015 | Di Bernardo | ................ | G01C 11/02 |
| | | | | 701/532 |
| 2015/0339797 A1* | 11/2015 | Lerios | ................ | G06F 8/423 |
| | | | | 345/522 |

OTHER PUBLICATIONS

NPL-Dondi-Pseudocode2js-V02-2010, located at http://myweb.lmu.edu/dondi/share/intro/pseudocode2js-v02.pdf Captured in 2010.*

Janos, "The algorithmicx package", 2005, Publshied at http://tug.ctan.org/macros/latex2e/contrib/algorithmicx/algorithmicx.pdf.*

Dondi, "From Pseudocode to Real code", 2010, Publsihed at http://myweb.lmu.edu/dondi/share/intro/pseudocode2js-v02.pdf.*

Rainey, "Evolution of Digital Photo Sharing Services", 2010, Published at https://amyrainey.wordpress.com/2010/08/05/evolution-of-digital-photo-sharing-services/.*

Lucey, "Accessing the GPU & the GPUImage Library", 2018, Carnegie Mellon University, publsihed at http://16623.courses.cs.cmu.edu/slides/Lecture_4.pdf.*

Janos, "The algorithmicx package", Apr. 2005, Published at http://tug.ctan.org/macros/latex2e/contrib/algorithmicx/algorithmicx.pdf (Year: 2005).*

* cited by examiner

LANGUAGE TRANSLATION USING PREPROCESSOR MACROS

CROSS-REFERENCE TO RELATED APPLICATIONS

This application is a continuation of U.S. patent application Ser. No. 13/328,049, filed Dec. 16, 2011, now U.S. Pat. No. 9,043,766, the entirety of which is hereby incorporated by reference.

BACKGROUND

This invention relates generally to code management systems, and more particularly to managing a software application across programming languages, such as for generating equivalent image filters in multiple programming languages.

The modern computer ecosystem comprises a wide array of computing device types and a wide array of programming languages. This ecosystem presents a challenge for engineers seeking to implement a write-once, use-many application that is portable across devices. Engineers who provide applications across the internet want to provide functionality to users in many devices, such as a mobile phone, a tablet, a desktop computer, etc. However, the programming language and tools available for each of these applications vary and present challenges for implementing identical functionality reliably across the various devices. In particular, a photo sharing service should provide users of an image filtering application with the guarantee that various devices use identical image filtering computations. However, programming these various devices using different languages and tools is cumbersome. Even in a single device, there may be several pathways for executing logic, such as a general and a specialized processor, each of which is programmed with a unique syntax or language.

SUMMARY

A method is described for creating specific language code to implement an image filtering system which enables designers to program in a single language using preprocessor macros and then generate executable code in multiple programming languages. The method uses normal expressions consistent with a source computer programming language to program the image filters. In an embodiment, the program code in the source computer programming language is written with preprocessor macros. The program code in the source computer language is drafted in statements and expressions consistent with normal programming in the source computer language, replacing the normal program control statements (e.g., variable declarations, control statements, etc.) with preprocessor macros. The preprocessor macros translate the normal program control statements to a general language representation using generalized programming objects to represent the control flow. Operator overloading of the generalized programming objects enables the general language representation to be created from the normal program statements. The general language representation is used to output specific language code consistent with the general language representation. The macros also enable the normal program statements to be directly compiled into an executable by replacing the preprocessor macros with the control flow statements normally used in the source computer language.

In one embodiment, this method is used to generate equivalent image filters in multiple programming languages. One image filtering technique treats each image filtering operation as an arithmetic process, for example by "mixing" the pixel values of image x to the pixel values of image y (e.g. .5x+.5y). For a photo sharing system, these image filtering operations may be provided to users in a variety of languages. For example, a user can download an application for a mobile phone, or download an image manipulation script for an internet browser of a desktop computer. Even within an application, there may be more than one way to process image processing commands, such as through a general computing processor (cpu) or a specialized processor like a graphical processor (gpu). Processing through a graphical processor may be accomplished through special graphics processor commands or a specialized library (e.g. OpenGL) implementing a language for the graphics processor (e.g. OpenGL Shading Language). Alternatively, the user may be operating a browser or system which is not configured to run any image processing, and the image processing is performed by an application on the photo sharing system. The general language representation can ensure that the image filtering techniques are the same across specific application languages.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

The language translation techniques of this application can be used to implement an image filter in a source language, and output the image filter logic in computer program code for a variety of specific languages. The source language in one embodiment and in the examples provided in this disclosure is C++, though any language can be used which supports preprocessing and operator overloading. The source language is converted into a general language representation which internally represents the source language programming logic, which is translated into specific languages. The specific languages can be any desired language for implementation on a target computing system. For example, specific languages can include compiled languages, scripting languages, and special library function calls within a compiled language (which may be the source language). The special library function calls can include, for example, the shading language of the OpenGL library, OpenGL SL. The specific languages can also include variants of the source language, such as obfuscated source language code, or source language code conforming to a particular style guide, or to-be-developed language extensions.

Figure 1:
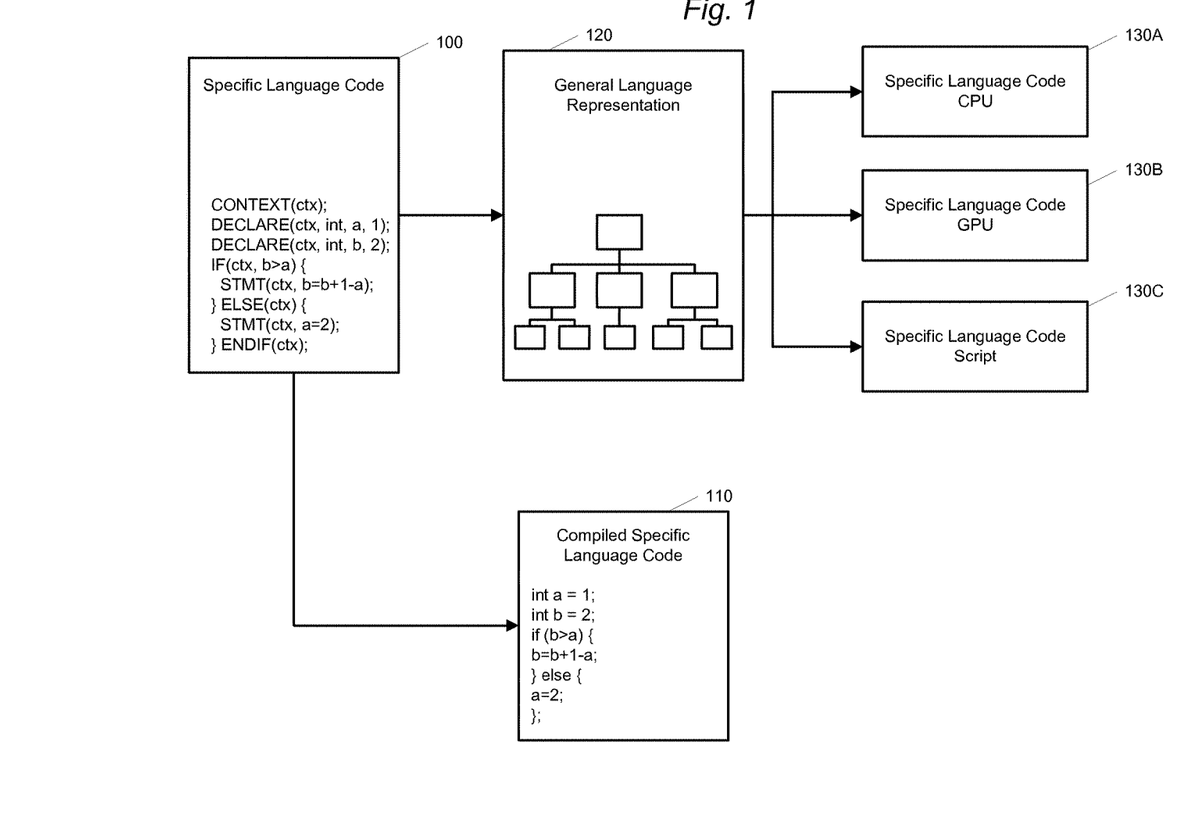
FIG. 1 is a data flow diagram according to one embodiment.

A conceptual overview of the translation process according to one embodiment is shown in FIG. 1. Source language code 100 is the original language which target programming logic is written in. For example, the target programming logic can be image filters, variable manipulation, or other processes with arbitrary complexity. As shown by the code depicted in FIG. 1, the source language code includes preprocessor macros, designated by all-caps, which describe the function being performed. For example, the source language code shown here includes a DECLARE macro for declaring a variable, an IF macro to indicate an "if" control flow, and a STMT macro to indicate a new statement line. As shown by this sample code, the statements within the macros are typically closely related to proper source language statements capable of use by the source language compiler. However, any easily-readable macro system may be used which can be converted to useable source language code.

Using these macros, the compiler can determine whether to expand the macros to create compiled specific language code 110, or expand them to create a general language representation 120. The compiler can use an execution argument or other flag to determine the macro expansion logic. One macro logic application causes the source language code 100 to be compiled to yield compiled specific language code 110. Another macro logic application causes the source language code 100 to generate a general language representation 120. The general language representation 120 can be used to generate specific language code 130A-C. The specific language code can include a compiled language for a CPU 130A, specific library code for a GPU 130B, or for a scripting language 130C.

The compiled specific language code 110 is developed from the source language code 100. The compiled specific language code is developed by the preprocessor macros to convert the macros embedded in the source language code to the logical functions used in the source language represented by the macros. For example, the first DECLARE macro indicates arguments (ctx, int, a, 1). The first argument indicates a context, which is used to create a general language representation, and can be discarded to create the compiled specific language code 110. Next are the variable type, variable name, and an initializer. During macro expansion, the preprocessor reorders these arguments if necessary and adds an initialization, the=operator, to generate "int a=1." For more complex variables, such as class instances, the macro can create an object constructor and allocate memory using the initializer, such as Object *a=new Object (<initialization string>).

Likewise, the IF macro removes the context argument and is replaced with "if." For a source language, such as C++, that does not require explicit statements or an endif control, these STMT and ENDIF macros are simply removed without any replacement text. By using this method of macro analysis, the normal program logic for the source language can be written as regular statements directly interpretable via the normal source language compiler. For example, the original source code line "STMT(ctx, b=b+1−a);" becomes "b=b+1−a;" which is valid syntactically in C++.

Using these macro wrappers describing the source language code control flow, the macros can also be used to generate the general language representation 120. The general language representation 120 is created using classes of expressions, operations, and variables to form an expression tree. Rather than executing "b=b+1−a," a general language representation is created to represent the expression. Using operator overloading, the operators between the variables are given representations as subclasses of an Expression object. For example, the+operator can be overloaded when used between Expressions to generate a new Expression, with Variables for the left- and right-hand side Expressions and a string for the operator value. The=operator can be overloaded to create an Assignment class object between the left- and right-hand expressions.

Using the general language representation 120, the specific language code 130 is created by calling a print function of the objects in the general language representation with the specific language as an argument. Each object type in the general language representation 120 includes a switch based on the available language types to output a translation of the logic representing that component in the specific language code. The specific language code 130 can then be implemented in other components of a specific language program.

Specific Language Code in a Photo Sharing System

Figure 2:
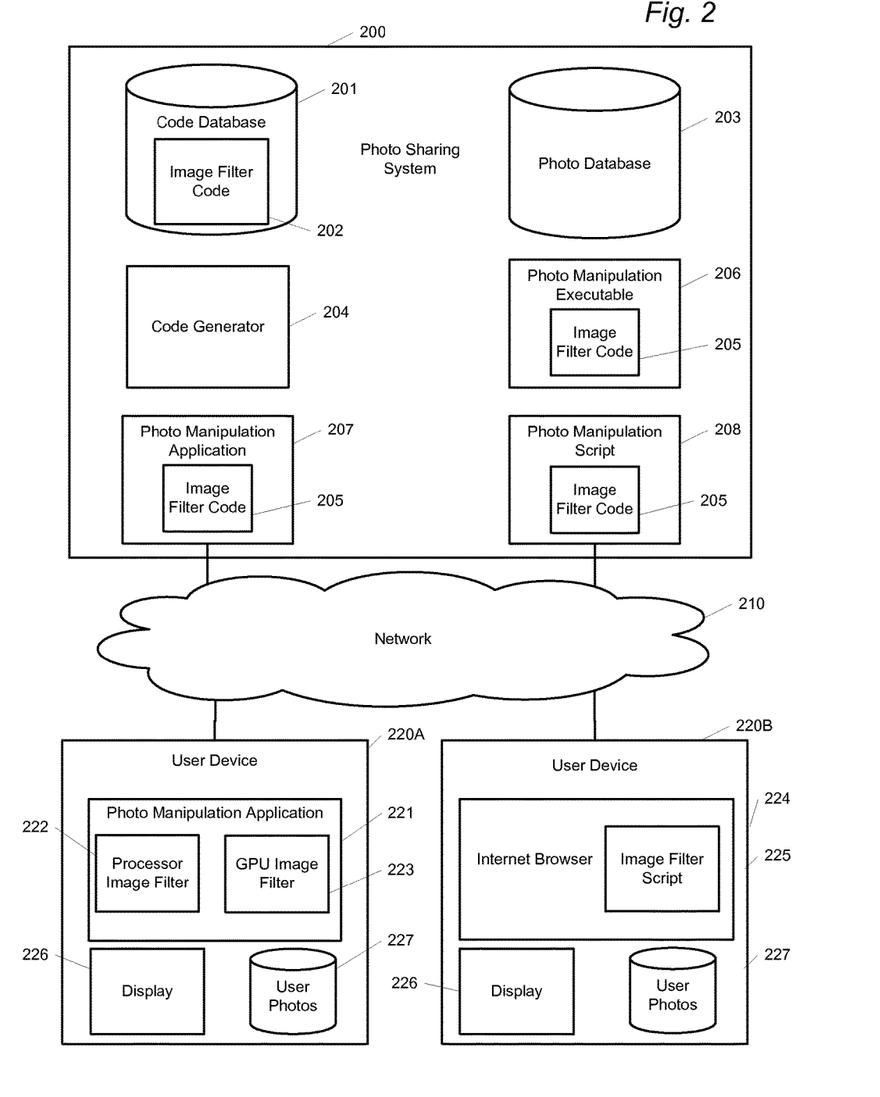
FIG. 2 is a system diagram of a photo sharing system implementing image filter code across a plurality of devices according to one embodiment.

Shown in FIG. 2 is a photo sharing system implementing language translation into several specific language codes. A photo sharing system 200 is connected through a network 210 to a plurality of user devices 220. The photo sharing system includes a photo database 203 for users of the user devices 220 to transmit and store photos to the photo database 203. The image filter logic may be implemented by the photo sharing system in a variety of locations, such as on the photo sharing system or on the user devices. The photo sharing system 200 includes a code database 201 and a code generator 204. The code database 201 includes the image filter code 202 for implementing the image filter logic. The image filter code 202 is written in a source language using macros and operator overloading as described above. The code generator 204 interprets the image filter code 202 and creates code for inclusion in specific language programs to implement the image filter code 202.

The specific language programs are shown in this embodiment to include a photo manipulation executable 206, a photo manipulation application 207, and a photo manipulation script 208. Each of these specific language programs includes image filter code 205 created from the code generator 204 applicable to the specific language. The photo manipulation executable 206 can be executed by the photo sharing system to process image filtering operations on photos in the photo database 203. The photo manipulation executable 206 enables photo processing server-side for user devices which are not configured to provide image processing techniques, such as a browser which is configured to only show pre-processed images. The photo manipulation application 207 is an application which can be downloaded by a user device to manipulate images on the user device, and may also provide an interface to the photo sharing system for uploading photos. Likewise, the photo manipulation script 208 is a script which can be downloaded by a user device, for example if referenced by a web page, and includes image filter code 205 for filtering images.

The network 210 can be any networking system for connecting different computers. Typically the network 210 is the internet. In view of the distributed nature of the network 210, the components of photo sharing system 200 can be comprised of several different individual systems or servers. For example, the code database 201 and code generator 204 may be on a non-public server, while the photo database 203 may be disposed on a separate server from the user-downloadable photo manipulation application 207 and script 208.

The user devices 220 are useable by the consumer to connect to the photo sharing system 200 and may also obtain and run photo manipulation programs. The user devices can be any system serviceable for photo manipulation, such as a mobile device, a stand-alone terminal, a tablet or desktop computer, a PDA, or other system for executing image manipulation processes. The user devices 220 typically include a display 226 and a collection of user photos 227 for use with the image manipulation program. The user devices 220 may also include a camera for generating new user photos 227.

User device 220A includes a photo manipulation application 221. In the embodiment shown of the user device 220A, the photo manipulation application 221 includes two image filtering components: a processor image filter 222 and a GPU image filter 223. In certain user devices, the user device includes a general purpose processor and a specialized graphics processor (GPU). The photo manipulation application in this embodiment includes image filters to apply filter logic to each processing channel. For example, the GPU image filter may comprise embedded OpenGL SL code which is translated by an Open GL library and provided to the GPU directly. When available, the GPU image filter 223 is typically faster and more efficient than the general processor image filter 222. However, the GPU image filter 223 may be limited in its applications. For example, the GPU or the GPU library may be limited in the resolution of 2D images it can manipulate. Alternatively, the GPU may provide efficient filtering processing for manipulation of images in the context of displaying the images to the user, but the GPU may have no mechanism for returning the manipulated images to be saved for further use by the program. As such it can be useful to have both a processor 222 and GPU image filter 223 in one photo manipulation application 221. Each filter was constructed by the code generator 204 using the image filter code 202. As a result, the filtering result for each processing path includes the same filtering logic despite that each path uses different languages or function calls.

The user device 220B includes, rather than a photo manipulation application 221, an internet browser 224. The internet browser, when directed to access a page of the photo sharing system 200 may be prompted to download and execute an image filter script 225. The image filter script can be any scripting language useable by the user device 220B, for example JavaScript or Adobe Flash-based ActionScript. The image filter script 225 can be a transferred instance of the photo manipulation script 208.

As shown by FIG. 2, the image filter code 202 is translated and propagated to a wide variety of programming environments, including across devices and across processing pathways within a single device. The process for generating a variety of applications including the image filter code is described next with respect to FIG. 3.

General Language Representation

Figure 3:
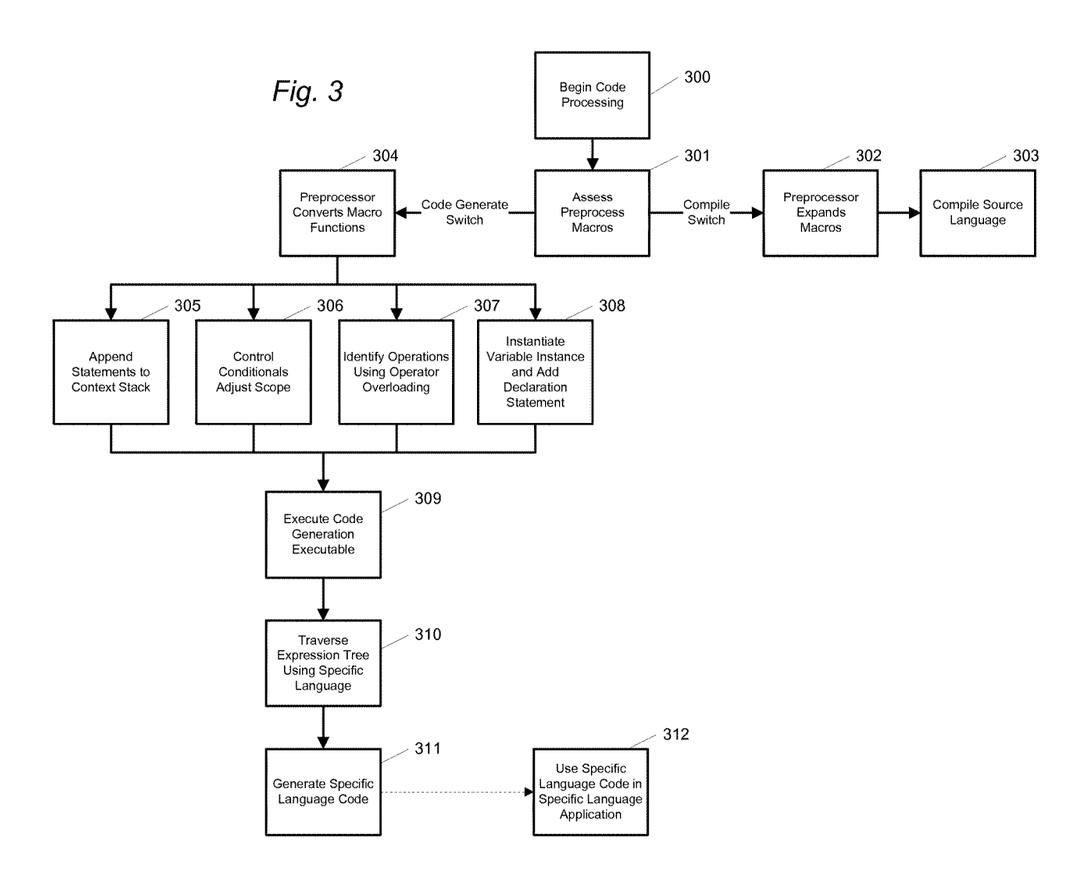
FIG. 3 is a flowchart describing a code translation process according to one embodiment.

FIG. 3 illustrates a method for generating specific language code using preprocessor macros and operator overloading in an embodiment. The compiler begins 300 processing the code for the source language, which includes preprocessor macros. The preprocessor macros are assessed 301 to determine how to process the macros. The preprocessor macro processing is assessed in one embodiment by a command-line argument to the compiler indicating which of two or more macro processing branches to follow. If the switch indicates no code should be generated, the preprocessor expands 302 the macros as described above to provide source code which when compiled 303 produces an executable which follows the desired process flow. For example, in the image filtering case, the compiled executable 303 filters images according to the filtering logic.

When the preprocessor designates a code generation function, the preprocessor macros are converted 304 into functions as described above. The functions are used to convert the code constructs provided as parameters to the macros into a general language representation by providing transitional phrases and other structural information to enable general language representation.

Several examples of these functions performed by the macros are illustrated for Statements 305, Conditionals 306, Operators 307, and Variables 308. These concepts are modeled in one embodiment as subclasses of an Expression class. Additional data types can be used in various embodiments according to the complexity of the general language representation desired. The expressions can be maintained by a context class, which can maintain a concept of the function depth of a series of statements or expressions. For example, a loop or if statement adds a function depth by adding a set of statements corresponding to the loop or if statement that are evaluated together.

When the STMT macro is applied by the preprocessor, it appends the applicable statement onto the current scope (that is, the current function depth) at the top of the context stack. The applicable statement may be complex: STMT (ctx, b=b+1−a). As a result, constructors are implicitly called, via operator overloading, to create an instance of an Expression associated with the statement "b=b+1−a." The resulting constructed objects form a tree of Expression objects. The root of the tree represents the assignment statement which is appended onto the context scope. This operator overloading can identify operations 307 and construct a class structure to represent an operation and its operand.

For example, an assignment overload for an Expression designates an Assignment subclass of an Expression which includes a left- and right-hand side Expression. The Assignment subclass enables the process to call a unique print( )function for the Assignment subclass rather than a generic Expression print( ) By overloading the=operator and designating a unique Assignment subclass, the print( )function of the subclass can be used to distinguish different code to be generated for the possible specific languages. In this way the Assignment class takes care of the language-specific syntactic differences in formulating an assignment. For example, a switch on print( )can output "=" for C++ and a ":=" for Pascal.

For operators which are undifferentiated in the specific languages implemented by the system, the operator can be represented as a string in a generic Expression class. For example, the< operator can be overloaded to generate an Expression with a left-hand Expression, a string with the value "<" and a right-hand Expression.

For certain operations, the specific languages may have no short form for the operation. For example, a specific language may not implement an equal-to-or-less-than operator ("<="). In this case, the overloaded<= operator can be used to assign a special LessThanOrEqualTo subclass. The LessThanOrEqualTo subclass can include the logic required in the print( )switch for each specific language to implement the logical flow represented by an equal-to-or-less-than operator.

Similarly, variable declarations 308 can be added as types of Expressions. The macro DECLARE can be used to instantiate a representation of the variable within the context of the running program (so that the code generation program recognizes the variable as a Variable when it is encountered in subsequent statements, thereby causing the compiler to use the overloaded operators of the Expression class to create trees of Expressions), as well as to create a declaration statement to implement the code generation of the variable. The declaration statement can be a subclass of an expression and include, for example, a variable type, the Variable object, and an initializer. By creating a subclass of statements for declaration statements, the declaration statement can manipulate the output of the code generator according to the variable instantiation syntax of the applicable specific language.

In a similar way, control macros 306 can be used to adjust the scope of the context for the program and are implemented as specialized statements. For example, a macro IF can be implemented as an IfStmt subclass of an Expression in a similar manner to the Assignment and variable declaration classes above. In addition, the IF macro can push and pop scopes from the context to create sequential blocks of statements. For example the blocks of statements within the "then" and "else" sections are pushed and popped from the scope as they are implemented. This indicates explicitly in the general language representation that certain blocks of statements are treated together and sequentially processed to completion. Similar techniques can be used for other control concepts, such as FOR or WHILE to implement various loops.

Using the expanded macros for the various program controls, the code generation program is compiled. Next, the code generation program is executed 309. During the code execution, the general language representation is generated in accordance with the expanded and compiled macros. Using the general language representation, the print function can be called on the program designating a language to output the general language representation in. The print( ) functions are called to traverse the expression tree 310, which finally generates the specific language code 311. The specific language code can now be used 312 in a specific language application to implement, in the specific language, the programming logic provided in the source language code.

General Language Representation

Figure 4:
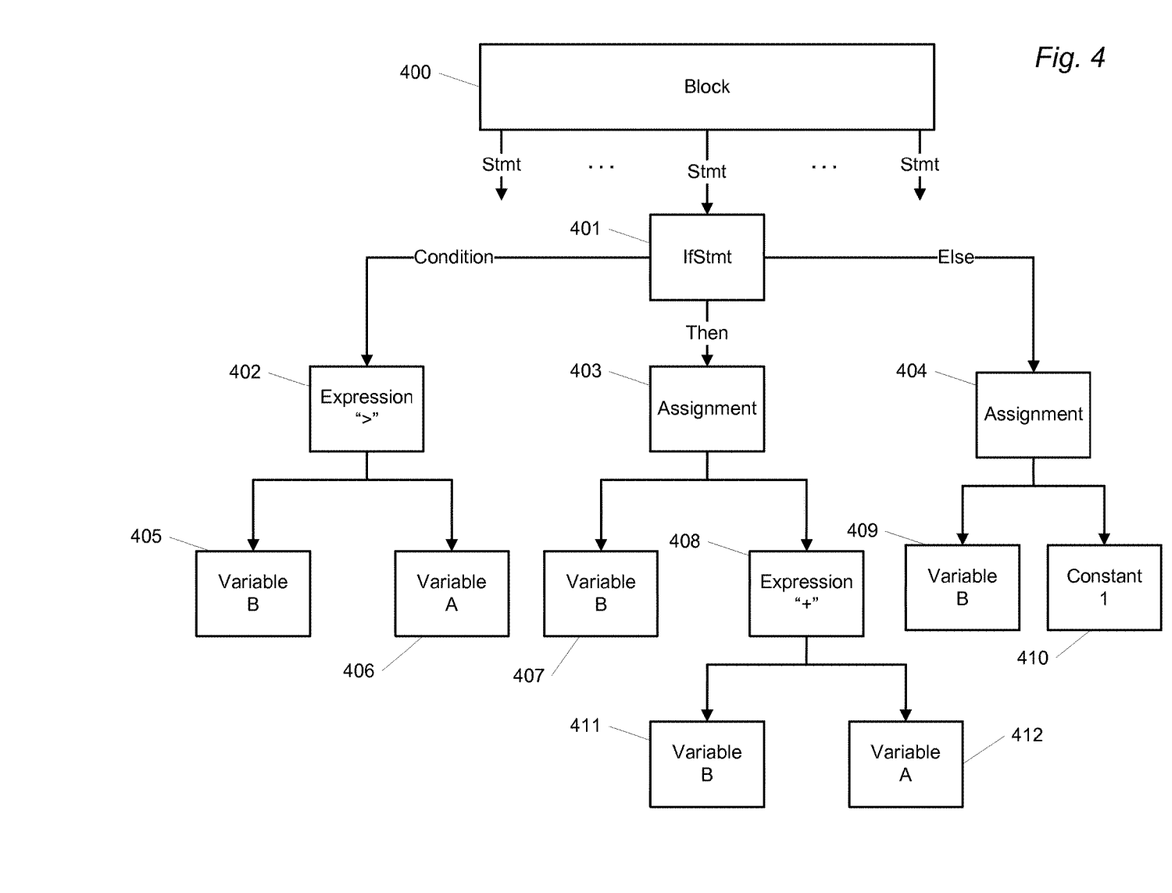
FIG. 4 illustrates a general language representation according to an embodiment.

An embodiment of the generalized language representation 120 is shown in FIG. 4. The block 400 is used to collect sequential statements in a particular language scope. As such, the block 400 can include several statements to be executed, though only one is fully shown here. The statement depicted represents a general language representation 120 of "IF (B>A) THEN (B=B+A) ELSE (B=1)." Using an IF macro, as described above, the IF macro can be interpreted as an IfStmt subclass 401 of a Statement subclass. As such, the IfStmt subclass includes a condition starting at Expression 402, a then statement beginning at Assignment 403, and an else statement at Assignment 404. While the "then" and "else" clauses are shown here as individual statements, in practice these are typically individual blocks, which in this embodiment contain a single statement each.

In this embodiment, the condition "B>A" is assessed by the compiler parsing the string by using an overloaded>operator, since each of B and A are recognized as type Variable (or a subclass thereof). Since the>operator is not given a special definition by a subclass, the> operator can be overloaded with an Expression class 402, which provides the left-hand side of the Variable B 405 and a right hand side of the Variable A 406 along with a string for the operator, ">."

Next, the block of statements for the "then" portion of the IfStmt are constructed from the string "B=B+A." In parsing this string, the compiler recognizes B and A as Variables, and uses the overloaded definitions of the operators= and + as relate to Variables to determine the proper response. Since the= operation is reflected differently according to the specific language, the= operation is reflected in an Assignment subclass 403. Rather than designating the particular connecting string as was used with the> Expression 402, the Assignment subclass can determine the proper string to represent an assignment to use for each specific language between the left- and right-hand sides of the Assignment. The left-hand is simply the string "B" which resolves to the Variable B 407. The right-hand side of the Assignment 403 is the string "B+A", which is interpreted as an Expression 408 similarly to the Expression 402. Likewise, the "Else" block of the IfStmt 401 which designates "B=1" becomes an Assignment subclass 404 with Variable B 409 and a Constant "1" subclass 410. Using the general language representation 120, the process traverses the tree to print the desired language-specific code.

Applications

In addition to the benefits of maintaining logical consistency across programming languages, the macro switching technique enables the same source language file to be used both as the source code for a compiled executable implementing the filter logic, and as the source for the general language representation. This enables a developer to determine on the compiled executable whether the program logic is correct and provides the desired results. If so, any errors in desired results can then be traced to an error in processing the source language code into the general language representation or from the general language representation to the specific language code.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for managing software across programming languages and generating equivalent image filters for different platforms using a general language representation of a program control flow, the method comprising:
   downloading, at a user device having a GPU and a CPU, an application from a photo sharing system, the application comprising a GPU image filter and a CPU image filter, wherein the GPU image filter and the CPU image filter are two different specific language representations each generated from the general language representation of the program control flow determined from compatible code in a source language;
   receiving a first image manipulation request at the user device to perform an image manipulation function on an image;
   performing the image manipulation function on the image via the GPU of the user device using the GPU image filter, the GPU performing the image manipulation function by executing the program control flow for the image manipulation function using the specific language representation for the GPU image filter, wherein the specific language representation includes special graphics processor commands or a specialized library implementing the specific language for the GPU;
   receiving a second image manipulation request at the user device to perform the image manipulation function on the image; and
   performing the image manipulation function on the image via the CPU of the user device using the CPU image filter, the CPU performing the image manipulation function by executing the program control flow for the image manipulation function, wherein the CPU performs image processing using the specific language representation for the CPU image filter which does not have access to the special graphics processor commands or the specialized library implementing the specific language for the GPU.

2. The method of claim 1, further comprising:
   receiving a third image manipulation request at a user device to perform the image manipulation function on the image;
   sending the third image manipulation request to a photo sharing system configured to perform the image manipulation function on the image and generate a resulting image; and
   receiving a manipulated image from the photo sharing system.

3. The method of claim 1, further comprising: receiving, by the user device, the CPU image filter and the GPU image filter from a photo sharing system.

4. The method of claim 1, wherein the GPU image filter and the CPU image filter are generated by:
   preprocessing computer programming code comprising a plurality of macros representing the program control flow to generate the general language representation of the program control flow; and
   compiling the preprocessed computer programming code to generate the GPU image filter and the CPU image filter.

5. A non-transitory, computer-readable medium comprising computer-executable instructions for managing software across programming languages and generating equivalent image filters for different platforms using a general language representation of a program control flow, the computer-readable instructions, when executed by a processor, cause the processor to:
   download, at a user device having a GPU and a CPU, an application from a photo sharing system, the application comprising a GPU image filter and a CPU image filter, wherein the GPU image filter and the CPU image filter are two different specific language representations each generated from the general language representation of the program control flow determined from compatible code in a source language;
   receive a first image manipulation request at the user device to perform an image manipulation function on an image;
   perform the image manipulation function on the image via the GPU of the user device using the GPU image filter, the GPU performing the image manipulation function by executing the program control flow for the image manipulation function using the specific language representation for the GPU image filter, wherein the specific language representation includes special graphics processor commands or a specialized library implementing the specific language for the GPU;
   receive a second image manipulation request at the user device to perform the image manipulation function on the image; and
   perform the image manipulation function on the image via the CPU of the user device using the CPU image filter, the CPU performing the image manipulation function by executing the program control flow for the image manipulation function, wherein the CPU performs image processing using the specific language representation for the CPU image filter which does not have access to the special graphics processor commands or the specialized library implementing the specific language for the GPU.

6. The computer-readable medium of claim 5, further comprising instructions to:
   receive a third image manipulation request at a user device to perform the image manipulation function on the image;
   send the third image manipulation request to a photo sharing system configured to perform the image manipulation function on the image and generate a resulting image; and receive a manipulated image from the photo sharing system.

7. The computer-readable medium of claim 5, further comprising instructions to: receive, by the user device, the CPU image filter and the GPU image filter from a photo sharing system.

8. The computer-readable medium of claim 5, wherein the GPU image filter and the CPU image filter are generated by:
preprocessing computer programming code comprising a plurality of macros representing the program control flow to generate the general language representation of the program control flow; and
compiling the preprocessed computer programming code to generate the CPU image filter and the CPU image filter.

* * * * *

UNITED STATES PATENT AND TRADEMARK OFFICE
CERTIFICATE OF CORRECTION

PATENT NO. : 10,269,087 B2
APPLICATION NO. : 14/720928
DATED : April 23, 2019
INVENTOR(S) : Apostolos Lerios Page 1 of 1

It is certified that error appears in the above-identified patent and that said Letters Patent is hereby corrected as shown below:

In the Claims

Column 11, Line 14, Claim 8, delete "generate the CPU image filter and the CPU image" and insert -- generate the GPU image filter and the CPU image --.

Signed and Sealed this
Twenty-fourth Day of September, 2019

Andrei Iancu
*Director of the United States Patent and Trademark Office*